Aug. 30, 1960    H. W. ROCKWELL ET AL    2,950,926
RETRACTABLE AUXILIARY WHEELS

Filed March 20, 1957      2 Sheets-Sheet 1

Inventors
Harvey W. Rockwell
Dale W. Hawk
By Charles L. Schwab
Attorney

Aug. 30, 1960     H. W. ROCKWELL ET AL     2,950,926
RETRACTABLE AUXILIARY WHEELS
Filed March 20, 1957     2 Sheets-Sheet 2

Inventors
Harvey W. Rockwell
Dale W. Hawk
By Charles L. Schwab
Attorney

United States Patent Office 2,950,926
Patented Aug. 30, 1960

2,950,926

RETRACTABLE AUXILIARY WHEELS

Harvey W. Rockwell and Dale W. Hawk, Cedar Rapids, Iowa, assignors to Allis-Chalmers Manufacturing Company, Milwaukee, Wis.

Filed Mar. 20, 1957, Ser. No. 647,347

3 Claims. (Cl. 280—405)

This invention relates to articulated land vehicles and is concerned particularly with a retractable wheel mechanism providing an auxiliary suspension to dampen vibrations and distribute the weight of the vehicle.

From the standpoint of operation efficiency, it is often desirable that the heavier type of articulated vehicle, such as, motor scraper, rock wagon, compactor, or an articulated rubber tired tractor, which is intended primarily for off the highway operation, be frequently operated on highways. Very often in earth moving operations involving "empty-return" phase of the work cycle, the articulated vehicle can be most conveniently routed on a highway to return to the loading site. In certain work operations, such as in highway rebuilding, operating the motor scraper off and on the highway contributes to the efficiency of the operation. Operation of such vehicles on the highway is especially desirable where motor scrapers are employed to do work on highway shoulders. Also, for other purposes, such as transportation of the vehicle from job to job, repair or servicing, it is economical to drive the vehicle on the highway rather than have the vehicle transported on a lowboy semitrailer truck or by some other similar means.

Operating the heavier type of articulated vehicle over the highways of the various States without exceeding the maximum axle loading prescribed by the law poses one problem, and the rhythmic bounce and pitch characteristics inherent in the articulated type of vehicle poses another problem. The present invention offers a solution to both of these problems.

The rythmic bounce and pitch characteristics of the articulated type of vehicle that result when it is operated on the highway at higher speeds are due to the inner play that occurs between the two articulated sections as the wheels pass over surface irregularities in the highway. A conventional coil spring type of suspension for auxiliary wheels used in connection with the vehicle to reduce its axle loading may aggravate these characteristics. It is desirable that a mechanism be provided that will effectively minimizes these objectionable characteristics. Likewise, these characteristics cause the load on an auxiliary wheel having a conventional spring suspension to vary as the vehicle is driven on the highway. A variation in the loading on the individual auxiliary wheels unbalances the load distribution between the two main axles of the vehicle and may increase the loading on one of the main axles beyond the prescribed legal limitation. It is required that the load distribution between the auxiliary wheels and the main wheels of the vehicle be continuously maintained as the vehicle is driven on the highway and subjected to the normal surface conditions of a highway.

The operational efficiency of a work cycle involving on and off the highway type of operation requires that the vehicle be easily and quickly converted to use on and off the highway. A dolly or caster arrangement defeats the purpose of such a work cycle because of the excessive time required to install the caster or dolly for on the highway type of operation and to remove it for off the highway type of operation. For this intermittent type of operation the auxiliary wheels must be retractable and within the conventional control of the operator of the vehicle.

It is an object of this invention to provide a retractable wheel mechanism that will take care of the hereinbefore outlined requirements in a simple, practical and entirely satisfactory manner.

More specifically, it is an object of this invention to provide a pressure fluid cylinder that will retract and lower a pair of wheels to distribute the weight of the vehicle so that its axle loading does not exceed the weight prescribed by the laws of the State in which it is operating and to provide a compressible fluid spring suspension that will effectively dampen the rhythmic bounce and pitch characteristics of an articulated vehicle when operated at high speeds.

It is an object of this invention to provide a mechanism that will substantially eliminate oscillations between the two articulated sections of the vehicle.

It is another object of this invention to provide a fluid pressure control system which will permit the operator of the vehicle to quickly and easily retract the wheels.

It is a further object of this invention to provide a retractable auxiliary wheel mechanism which, when attached to a heavier type of articulated vehicle, makes it possible for the vehicle to be transported on the highways within legal weight limitations on its own wheels and under its own power.

It is still a further object of this invention to transfer the weight from an axle which is normally overloaded for highway transport purposes to an axle or axles which are not overloaded, thereby providing axle loadings which permit the vehicle to travel on highways without exceeding the maximum weight limit prescribed by law.

These and other objects of this invention will be evident from the following description when read in connection with the accompanying drawing, in which.

For purposes of illustration, an articulated vehicle in which the present invention is embodied has been shown in the form of a motor scraper such as is described and illustrated in the copending application Serial Number 498,338, filed March 31, 1955 now Patent No. 2,901,844. The motor scraper comprises a front and a rear section which are articulated for relative motion about a vertical pivotal axis 11 and a longitudinal tilting axis 12. The front section is a two wheeled tractor 13 and the rear section consists of the draft yoke and scraper body, a portion of which is shown.

Figure 1:
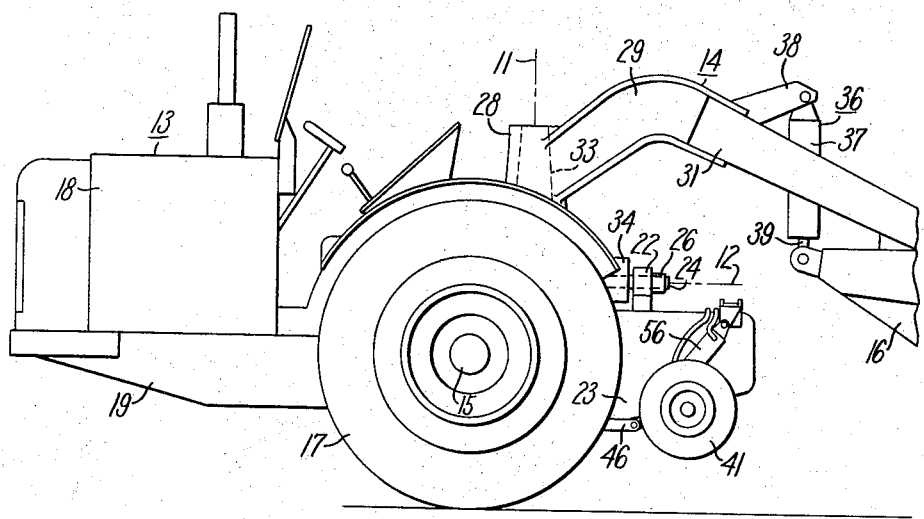
Fig. 1 is a side view of a motor scraper showing the retractable wheels in a fully retracted or "wheels up" position.
Figure 2:
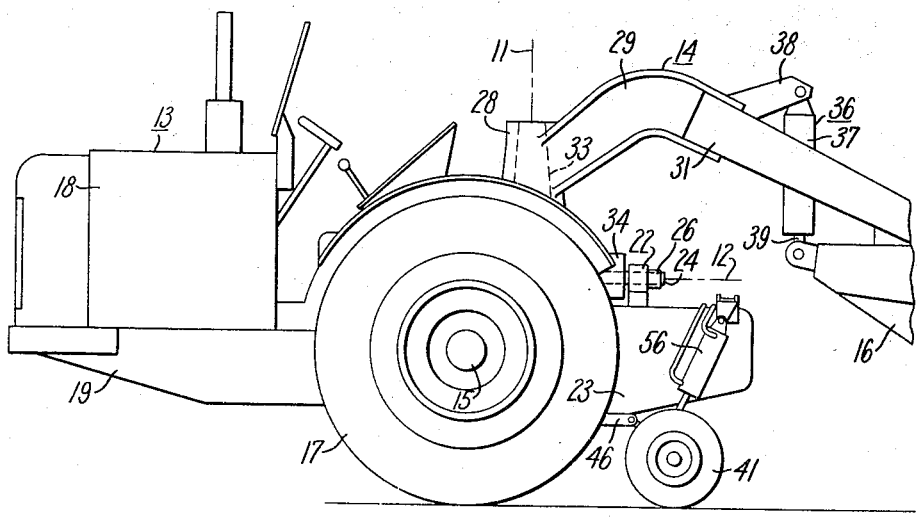
Fig. 2 is a side view of the motor scraper showing the retractable auxiliary wheels in a fully lowered or "wheels down" position.
Figure 3:
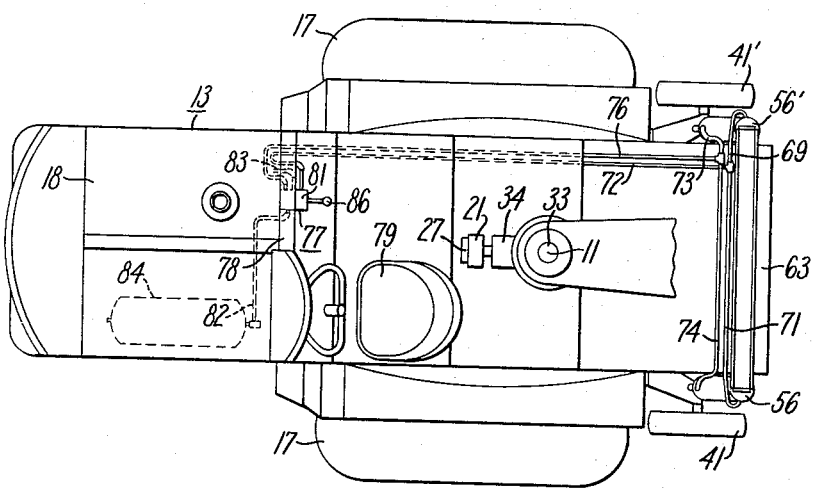
Fig. 3 is a top view of the motor scraper illustrating the control system for the retractable wheel mechanism.

Referring to Figs. 1, 2 and 3, the tractor 13 has a pair of traction wheels 17 rotatably carried by the axle 15 driven by an engine enclosed under the hood 18 and supported by the tractor frame 19. Two upstanding hitch mountings 21, 22 are attached to a central portion of the tractor gear case 23 and project upwardly therefrom to support a horizontal pivot pin 24. A nut 26 and a flange 27 hold the horizontal pivot pin 24 against longitudinal displacement within the hitch mountings 21, 22. The draft yoke 14 includes a king pin housing 28, a gooseneck 29 and a pair of rearwardly extending legs 31, only a portion of which is shown. The legs 31 are pivotally connected to opposite sides of a conventional scraper bowl 16 supported by a pair of ground engaging wheels, not shown.

The kingpin housing 28 rotatably engages a kingpin 33 which is rigidly connected to a sleeve 34 and is restrained against longitudinal motion relative to the tractor 13 by the two hitch mountings 21, 22. The horizontal sleeve 34 is rotatably mounted on the horizontal pivot pin 24. The vertical axis 11 of the kingpin 33 intersects the axis 12 of the horizontal pivot pin 24 at right angles. This type of articulation permits the two sections to angle about the vertical axis 11 for steering and also permits the two sections to tilt about the longitudinal axis 12.

A pair of vertically disposed hydraulic rams 36 are provided for lowering the forward end of the bowl 16 so that it can be loaded and for raising the bowl 16 to a traveling position, as shown in Figs. 1 and 2. Ram 36 has its cylinder 37 pivotally connected at its upper end to an overhanging bracket 38 rigidly secured to the draft yoke 14 and has its piston rod 39 pivotally connected to a forward reaching side of the scraper bowl 16. These two rams 36 prevent any rotation of the scraper bowl 16 relative to the draft yoke 14.

Figure 4:
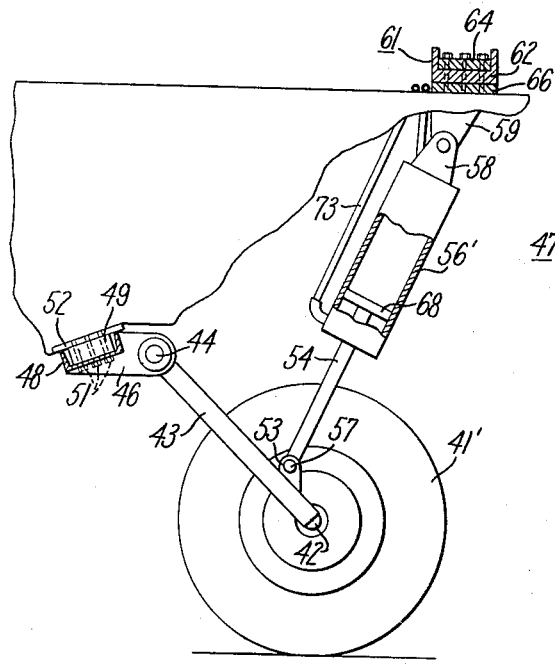
Fig. 4 is a fragmentary side view of the retractable wheel mechanism in the fully lowered position.
Figure 5:
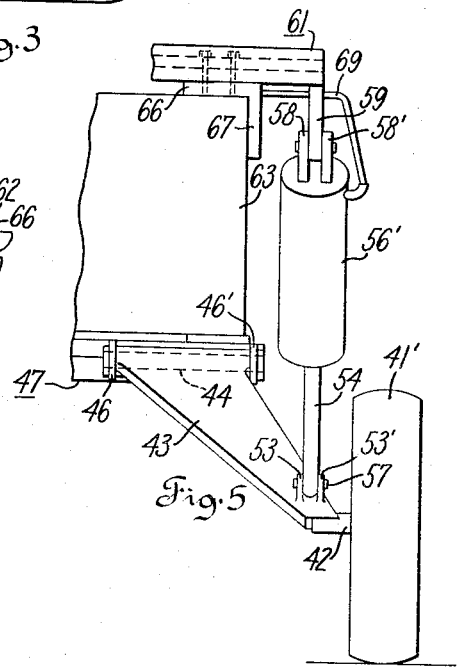
Fig. 5 is a fragmentary end view of the retractable wheel mechanism.

Referring to Figs. 4 and 5, a conventional rubber wheel 41 is shown mounted on a spindle and rotatably carried by suitable bearings, not shown. A spindle 42 is welded to one end of a trailing link support arm 43. The support arm 43 pivots about a pin 44 which is rotatably supported by two laterally spaced ears 46, 46'. The trailing link support arm 43 is trapezoidal in shape and is formed with a bore to receive the support arm pivot pin 44 forming one of the parallel sides of the trapezoid and the spindle 42 forming the other parallel side. The other two sides are shaped to provide the desired lateral displacement of the wheels 41 from the gear case 23.

A support member 47 which runs the full width of the tractor gear case 23 mounts one pair of the laterally spaced support ears 46, 46' at each end. The support member 47 includes a channel 48 with a mounting block 49 attached at each end. To render the member 47 detachable from the tractor gear case 23 the member 47 is secured by a plurality of cap screws 51 to short tapping plates 52 welded to the tractor gear case 23 at each side. Near the lower end of each support arm 43 a pair of laterally spaced ears 53, 53' are rigidly attached.

When the motor scraper is operated on the highway at high speeds, some vertical displacements of the ground engaging support wheels are not effectively dampened out by the rubber tires. Due to the resiliency of the low pressure rubber tire, oscillations result which are transmitted to the structure of the vehicle. In view of the fact that the engine overhangs to the front of the two tractor wheels 17, this mass concentration in effect functions as a pendulum and some of the oscillations thus transmitted between the sections of the vehicle tend to be amplified. Any such interplay between the sections of the vehicle also tends to reduce the service life of the hitch mounting 21 and 22.

The present invention is directed at the problem of minimizing these oscillations and removing a portion of the load off the front axle 15 and the rear axle, not shown, so that the axle loading will come within the limitations imposed by State laws for highway operation. In the present application of the invention, a pair of auxiliary wheels 41, 41' are shown mounted at the rear of the tractor. Where this invention is to be mounted in a particular installation will depend to some extent upon the mass distribution in the two sections of the vehicle. In some applications, such as where the draft section consists of a four wheel tractor, it may be desirable to locate the auxiliary wheels 41, 41' at some point on the rear section. The optimum location can generally be determined by experimentally testing the wheels 41, 41' at various locations.

A piston rod 54 of an air cylinder 56 is pivotally connected by a pin 57 to the supports 53, 53'. At the other end of the air cylinder 56 a pair of connecting ears 58, 58' are provided to pivotally connect the cylinder 56 to a bracket 59.

The bracket 59 is welded to an upper member 61 comprising a channel 62 extending over the entire width of a rear portion 63 of the gear case 23 and projecting slightly over the side. A reinforcing bar 64 at each end furnishes additional rigidity to the overhanging portion of the member 61. The member 61 is also detachably secured to two tapping plates 66 which are welded to each side of the rear portion 63. Suitable reinforcing plates 67 are welded to each side of the rear portion 63 to distribute the stress over a larger area of the fuel tank side.

In the applicants' preferred embodiment of their invention, air is used as the compressible fluid supplied to the cylinder 56. Air pressure is readily available in a motor scraper and has excellent damping properties, which make it particularly suitable in a damping device. Other highly compressible fluids may be used. The term "compressible fluid," as used herein, does not include liquids which are for most practical purposes incompressible.

The air cylinder 56 is of the double acting type. A piston 68 is reciprocably fitted within the cylinder bore and operably connected to one end of the piston rod 54. At its other end the rod 54 is directly attached by a pivotal connection to the support arm 43. The two branches 69, 71 of the conduit 72 are connected to the upper portion of the cylinders 56, 56' and the two branches 73, 74 of the conduit 76 are connected to the lower portion of the cylinder 56.

As shown in Fig. 3, a four way control valve 77 is mounted on a dashboard 78 at a convenient distance from an operator's seat 79. A valve housing 81 forms a common connection for an air supply line 82, an exhaust line 83 and the two cylinder conduits 72, 76. The air supply line 82 is connected also at one end to an air tank 84. A compressor (not shown) supplies air to the air tank 84 where it is maintained at a predetermined pressure. The exhaust line 83 is open at one end to the atmosphere. A valve handle 86 is selectively settable to two control positions, a "wheels up" and a "wheels down" position. In the "wheels up" position of the valve handle 86 the wheels 41, 41' are raised and kept in a retracted position. That is, the air supply line 82 is connected with the cylinder conduit 76 and the cylinder conduit 72 is connected with the exhaust line 83. In the "wheels down" position of the valve handle 86 the auxiliary wheels 41, 41' are lowered and maintained in a ground engaging position. For this control position of the valve 77 the air supply line 82 is connected with the cylinder conduit 72 and the cylinder conduit 76 is connected with the exhaust line 83.

Whenever the operator desires to lower the auxiliary wheels 41, 41', he pushes downwardly on the handle 86 to place the valve 77 in a "wheels down" position. With the valve 77 in this position air pressure is admitted into conduit 72 and into the branches 69, 71 to the cylinder 56 where the air pressure now exerts a force on the upper side of the reciprocable piston 68. Likewise, for the "wheels down" position of the valve 77, the conduit 76 is connected with the exhaust line, causing the air pressure acting against the lower side of the piston 68 to be exhausted. The air pressure on the top side of the piston 68 can now urge the piston rod 54 in a downward direction to lower the auxiliary wheels 41, 41'. The piston rod 54 will swing the wheel support arms 43, 43' downwardly until both wheels 41, 41' are in contact with the ground. Since no mechanical or spring type of suspension is provided for the swingable support arms 43, any ground reaction forces are transmitted to the air cushion on the upper side of the piston 68 and to the bracket 59 connecting the cylinder 56' to the member 61. The air in the upper portion of the cylinder 56' thus forms a true air suspension for the auxiliary wheel 41' and oscillations in the vehicle are effectively dampened. The high damping properties of air in this type of auxiliary suspension contribute to the stabilization of the vehicle as it is operated at higher speeds over highways. Although two auxiliary wheels 41, 41' and cylinders 56, 56' are used in the applicants' embodiment, it is readily apparent that one or more can be used in a given application to produce the desired stabilizing effect.

A necessary consequence of having a pair of auxiliary ground engaging wheels 41, 41' suspended from the vehicle is that the auxiliary wheel will support a portion of the weight of the vehicle. When used in a given application to transfer weight from one axle of the vehicle to another, it can serve also as a traction boosting device. In the applicants' embodiment, it is primarily used to reduce the axle loading.

A motor scraper, such as is illustrated in the drawing, has a tractor axle loading of 19,850 lbs. and a scraper axle loading of 9,380 lbs. When the vehicle is operated in a loaded condition, the axle loadings are considerably increased. A vehicle with an axle loading of 19,850 lbs. could not legally be operated on most of the State highways. Generally, the State laws impose axle limitations of 18,000 lbs. per axle. By the use of the two auxiliary wheels, 41, 41', it was possible to reduce the loading on the tractor axle to 17,400 lbs.

It should be noted that the equivalent spring constant of the air spring suspension can be varied by increasing or decreasing the air pressure in the penumatic cylinders 56, 56' supporting the wheels. The load distribution may also be varied by increasing the number of auxiliary wheel units on a vehicle. Where the auxiliary wheels are to be located in a given application will depend on a number of factors, such as the mass distribution between the front and rear sections of the articulated vehicle and the structural design of the vehicle. In some applications it may be desirable to locate auxiliary wheels in the vicinity of both the front and rear wheels of the vehicle. In the motor scraper, illustrated in the drawings, it was experimentally determined that a location slightly to the rear of the tractor wheels gave highly satisfactory results from a stability and load distribution standpoint.

From the foregoing description of this invention it can be readily seen that an auxiliary pneumatic suspension in an articulated vehicle will provide smooth riding when the vehicle is operated on the highway and will also enable heavier types of articulated vehicles to be operated on the highway where normally such vehicles would exceed the maximum axle loading limitations set by law.

It should be understood that it is not intended to limit the invention to the particular form and details described hereinabove and that the invention includes such other forms and modifications as are embraced by the scope of the appended claims.

What is claimed is:

1. In a two axle self-propelled earth moving vehicle having a tractor unit articulated with a trailing unit about a vertical and a longitudinal axis, an auxiliary ground engaging apparatus comprising: ground engaging means including a rotatable ground wheel, a double acting compressible fluid pressure operated jack having a pair of relatively extendable and retractible elements respectively connected in thrust transmitting relationship with said ground wheel and with one of said units of the vehicle at a point between the two axles of the vehicle, and means for selectively directing pressurized fluid to and from said ram thereby moving said ground wheel out of and into a ground engaging position, in said ground engaging position the compressible fluid serving as an auxiliary resilient means for suspending the vehicle with respect to the ground.

2. In a two axle self-propelled earth moving vehicle having a tractor unit articulated with a trailing unit about a vertical axis and a longitudinal axis, each of said units having a main frame and an axle with a pair of rubber tired ground engaging wheels to provide a reislient support for the vehicle, an auxiliary ground engaging apparatus comprising: an arm pivoted to the main frame of one of said units of the vehicle at a point between the two axles thereof, said arm being swingable in a vertical plane, a ground engaging wheel mounted on said arm for rotation about a horizontal axis, a double acting jack including piston and cylinder elements operatively interposed in thrust transmitting relationship between said frame of said one unit and said wheel, and fluid pressure means for regulating compressible fluid pressure to said cylinder element for selectively raising said wheel out of and lowering said wheel into a ground engaging position, in said ground engaging position the compressible fluid serving as an auxiliary resilient means for suspending the vehicle with respect to the ground.

3. The combination set forth in claim 2 including means for pivotally connecting one of said piston and cylinder elements in thrust transmitting relationship with said arm and means for pivotally connecting the other of said piston and cylinder elements in thrust transmitting relationship on the frame of said one unit; and wherein said arm is pivotally connected to the frame of said one unit for swingable movement about a horizontal pivot axis extending transversely of the vehicle.

References Cited in the file of this patent

UNITED STATES PATENTS

| | | |
|---|---|---|
| 2,142,216 | Seyferth | Jan. 3, 1939 |
| 2,266,913 | Simmons | Dec. 23, 1941 |
| 2,298,282 | Brown | Oct. 13, 1942 |
| 2,368,202 | Clark | Jan. 30, 1945 |
| 2,421,867 | Bizjak | June 10, 1947 |
| 2,463,746 | Conley et al. | Mar. 8, 1949 |
| 2,650,679 | Durkin | Sept. 1, 1953 |
| 2,818,139 | Sutter | Dec. 31, 1957 |

FOREIGN PATENTS

| | | |
|---|---|---|
| 599,711 | Germany | July 7, 1934 |